No. 880,923. PATENTED MAR. 3, 1908.
B. F. SCHIRMER.
NON-PUNCTURABLE INNER TIRE.
APPLICATION FILED NOV. 6, 1905.

Witnesses
C. H. Olds
Wm. T. Amos

Inventor
Baldwin F. Schirmer
by Wm. M. Monroe
Attorney

UNITED STATES PATENT OFFICE.

BALDWIN F. SCHIRMER, OF INDIANAPOLIS, INDIANA

NON-PUNCTURABLE INNER TIRE.

No. 380,923.  Specification of Letters Patent.  Patented March 3, 1908.

Application filed November 6, 1905. Serial No. 286,025.

*To all whom it may concern:*

Be it known that I, BALDWIN F. SCHIRMER, a citizen of the United States, and resident of Indianapolis, county of Marion, State of Indiana, have invented certain new and useful Improvements in Non-Puncturable Inner Tires, of which I hereby declare the following to be a full, clear, and exact description, such as will enable others skilled in the art to which it appertains to make and use the same.

The objects of the invention are to provide a non-puncturable inner tire for pneumatic or other tires for wheeled vehicles, by means of which the tire will always remain inflated and will not be exposed to injury from contact with broken glass, horse shoe nails or other cutting or pointed objects commonly encountered upon country roads and city streets.

The invention comprises a series of inflated buffer springs or compressed air cylinders having pistons therein, arranged about the rim of the wheel, a common annular air chamber for the cylinders and an outer tire inclosing the buffer springs, which can be formed of rubber or any fibrous material or webbing having the requisite strength and impregnated with water proof and air proof material.

The invention further consists in the multiple compressed air and vacuum chambers, and the various details of construction and combination and arrangement of parts, as hereinafter described, shown in the accompanying drawings and specifically pointed out in the claims.

Figure 1:
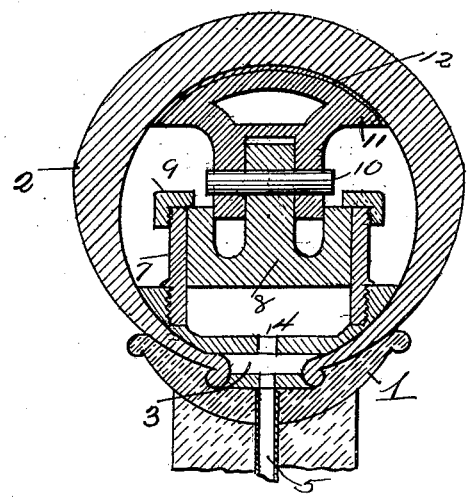
Figure 2:
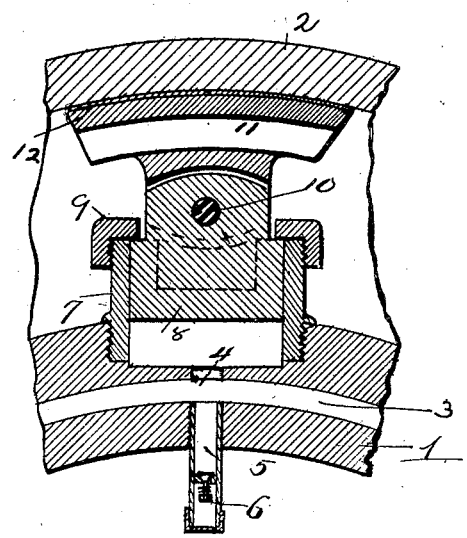
Figure 3:
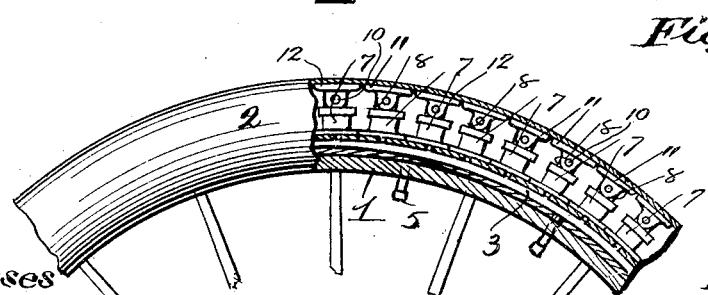

In the accompanying drawings Figure 1 is a transverse section of a tire and rim, showing a buffer spring or compressed air cylinder and piston in longitudinal section; Fig. 2 is a section thereof taken on a plane at right angles to that of Fig. 1; Fig. 3 is a view of a portion of a wheel tire showing a series of the buffer springs and a common compressed air chamber.

In these views, 1 is the wooden or other tire of the wheel, 2 the outer tire of flexible and preferably air proof material, 3 is an annular chamber which is provided with openings 4 which communicate severally with the compressed air cylinders housed within the outer tire. An admission tube 5, and check valve 6, permit the entrance of the air to this chamber 3. In the inner wall of this chamber are secured the cylinders 7 communicating with the openings 4. Within each cylinder reciprocates a piston 8, which is retained therein by the cap or head 9, and pivoted upon the piston at 10 to permit of perfect adjustment to the outer tube is a shoe 11, which may be composed of any material most suitable and may possess a rubber lining at 12. The outer edge of this shoe should conform in shape to the arc of the outer tire with which it engages.

It will readily be seen that a complete circumference is provided for the inner tire, composed of this series of piston shoes as seen in Fig. 3 and that pressure upon any part is resisted by the compressed air within the cylinders, thus forming a uniformly resilient tire of great strength and incapable of injury from any object ordinarily encountered in touring upon the roads or pavement.

Having described the invention what I claim as new and desire to secure by Letters Patent is:

1. The combination with the rim and tubular tire, of an annular chamber adjacent to the rim, a series of cylinders housed within the tubular tire and communicating with said chamber, a piston in each chamber, and a shoe pivoted upon each piston and adapted to engage the inner surface of the tubular tire, substantially as described.

2. The combination with a rim, and a tubular resilient tire thereon, of an annular chamber in the rim, a series of cylinders housed within the resilient tire and radially secured therein and severally communicating with said chamber pistons in said cylinders, and a shoe for each piston, each shoe having an extended base and pivotally connected with its piston, substantially as described.

3. The combination with a rim, and a tubular resilient tire thereon, of an annular chamber in the rim, a series of cylinders secured radially in the outer wall of said chamber, and communicating with said opening, the said cylinders being housed within the said tubular tire, a pivoted outer portion for each piston and a foot therefor curved laterally on its outer edge to engage the inner surface of the tire, and an admission tube for air leading to said chamber and check valve therefor, substantially as described.

In testimony whereof I hereunto set my hand this 12th day of Sep. 1905.

BALDWIN F. SCHIRMER.

Witnesses:
WM. M. MONROE,
C. H. OLDS.